US008853652B2

(12) United States Patent
Jagannathan et al.

(10) Patent No.: US 8,853,652 B2
(45) Date of Patent: Oct. 7, 2014

(54) LAMINATED STORAGE PHOSPHOR PANEL WITH THERMALLY-SENSITIVE ADHESIVE AND METHODS OF MAKING THEREOF

(71) Applicant: Carestream Health, Inc., Rochester, NY (US)

(72) Inventors: Seshadri Jagannathan, Rochester, NY (US); Charles M. Rankin, Penfield, NY (US); Daniel M. Leusch, Rochester, NY (US)

(\*) Notice: Subject to any disclaimer, the term of this patent is extended or adjusted under 35 U.S.C. 154(b) by 0 days.

(21) Appl. No.: 14/136,084

(22) Filed: Dec. 20, 2013

(65) Prior Publication Data

US 2014/0113130 A1   Apr. 24, 2014

Related U.S. Application Data

(63) Continuation-in-part of application No. 13/300,925, filed on Nov. 21, 2011, now Pat. No. 8,629,402.

(51) Int. Cl.

| | | |
|---|---|---|
| G03B 42/08 | (2006.01) | |
| B05D 3/00 | (2006.01) | |
| B32B 37/12 | (2006.01) | |
| B05D 5/10 | (2006.01) | |
| H01J 1/70 | (2006.01) | |
| B32B 38/16 | (2006.01) | |

(52) U.S. Cl.
CPC .............. H01J 1/70 (2013.01); B32B 2309/105 (2013.01); B32B 2310/0831 (2013.01); B05D 3/00 (2013.01); B32B 37/1284 (2013.01); B05D 5/10 (2013.01); B32B 2038/168 (2013.01); B32B 2607/00 (2013.01); B32B 2310/0887 (2013.01); B32B 2559/00 (2013.01)
USPC ....................................... 250/484.4; 250/581

(58) Field of Classification Search
USPC ........ 250/361 R, 362, 370.09, 370.11, 484.4, 250/581
See application file for complete search history.

(56) References Cited

U.S. PATENT DOCUMENTS

| | | | |
|---|---|---|---|
| 4,380,702 | A | 4/1983 | Takahashi et al. |
| 4,758,488 | A | 7/1988 | Johnson et al. |
| 4,926,047 | A | 5/1990 | Takahashi et al. |
| 5,077,144 | A | 12/1991 | Takahashi et al. |
| 5,401,971 | A | 3/1995 | Roberts |
| 5,427,868 | A | 6/1995 | Bringley et al. |
| 5,464,568 | A | 11/1995 | Bringley et al. |
| 5,507,976 | A | 4/1996 | Bringley et al. |
| 5,523,558 | A | 6/1996 | Bringley et al. |
| 5,549,843 | A | 8/1996 | Smith et al. |
| 5,639,400 | A | 6/1997 | Roberts et al. |
| 2002/0131547 | A1 | 9/2002 | Riedner et al. |
| 2008/0280037 | A1 | 11/2008 | Sheridan et al. |

FOREIGN PATENT DOCUMENTS

| | | |
|---|---|---|
| CA | 1246300 | 12/1988 |
| EP | 0 282 080 A2 | 9/1988 |
| WO | WO2010/058335 A2 | 5/2010 |

OTHER PUBLICATIONS

International Search Report for International Application No. PCT/US2012/062941 mailed Mar. 18, 2013, 3 pages.

*Primary Examiner* — Mark R Gaworecki

(57) ABSTRACT

Provided herein are exemplary embodiments for phosphor screen including a substrate, a stimulable phosphor layer disposed over the substrate, the stimulable phosphor layer including a stimulable phosphor material, and an adhesive layer disposed by solvent coating over the stimulable phosphor layer, the adhesive layer including solvent-coatable thermally-sensitive elastomers, where the adhesive layer has a dust adhesion of $\leq 1$ dust particles/sq.in.

18 Claims, 5 Drawing Sheets

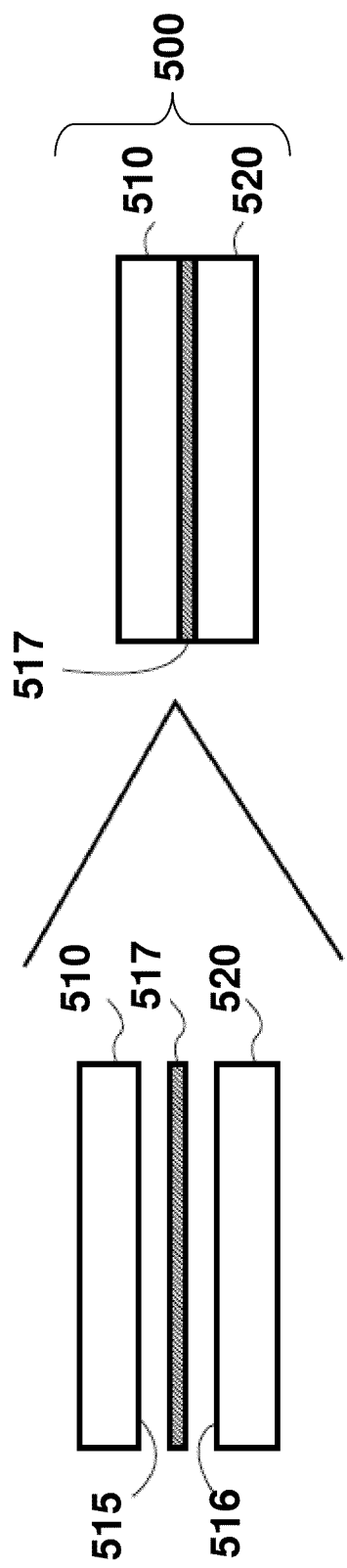

LAMINATED STORAGE PHOSPHOR PANEL WITH THERMALLY-SENSITIVE ADHESIVE AND METHODS OF MAKING THEREOF

CROSS REFERENCE TO RELATED APPLICATIONS

This application is a Continuation-in-Part of earlier filed commonly assigned, copending U.S. patent application Ser. No. 13/300,925, filed Nov. 21, 2011, entitled "X-RAY IMAGING PANEL WITH THERMALLY-SENSITIVE ADHESIVE AND METHODS OF MAKING THEREOF", in the name of Bryan P. Aylward et al., which is incorporated herein by reference in its entirety.

FIELD OF THE INVENTION

The invention relates generally to X-ray imaging systems. More specifically, the invention relates to X-ray imaging panels having non-dust adhering adhesive layer and a laminated protective layer, and methods for making the same.

BACKGROUND OF THE INVENTION

Digital radiography (DR) is increasingly accepted as an alternative to film-based imaging technologies that rely on photosensitive film layers to capture radiation exposure and thus to produce and store an image of a subject's internal physical features. With digital radiography, the radiation image exposures captured on radiation-sensitive layers in X-ray imaging panels are converted to electronic image data which is then stored in memory circuitry for subsequent readout and display on suitable electronic image display devices.

Generally, a scintillator (or scintillation) screen responds to incident X-ray radiation by generating visible light that is, in turn, detected by a photodetector having photosensors. The light information from the photodetector is subsequently transmitted to charge amplifiers. The outputs of the charge amplifiers are then typically applied to other circuitry that generates digitized image data that then can be stored and suitably image-processed as needed for subsequent storage and display. However, because scintillator materials respond to incident x-ray radiation by emitting light over a broad range of angles, there is some inherent amount of scattering in the detection process. This reduces the optical efficiency of image formation due to loss of light, signal crosstalk, and related effects, and tends to degrade image quality.

For example, a scintillator screen typically has a scintillation layer formed on a support that is highly transmissive to incident X-ray radiation. A protective overcoat layer may optionally be provided over the scintillation layer. Scintillator material in the scintillation layer responds to incident X-rays by emitting photons toward a photosensor, but over a broad range of angles, including angles at which the emitted light is effectively wasted due to total internal reflection (TIR) effects within the scintillation layer or, if provided, the overcoat layer. But so long as there is good optical coupling between the scintillator screen and the photodetector, a sufficient amount of the emitted signal is directed toward the photosensor.

In practice, there is often poor optical coupling between the scintillator screen and the photodetector. Air gaps or airborne contaminants, such as dust, can be trapped between the scintillator screen and the photodetector. For light at very small angles of incidence (relative to normal), the net effect of air gaps or airborne contaminants can be negligible. But for light at larger angles, air gaps or airborne contaminants can cause problems. When light is incident from a dense medium with a higher index of refraction, n, to a rare medium with a lower index of refraction, n', (e.g., n'=1.0 for air), TIR may occur at the interface of the two media depending on the angle of incidence. This means that some portion of light is lost, and another portion can be redirected to the wrong photodetector, i.e., crosstalk. The net effect includes lost efficiency and reduced spatial resolution, which is generally measured by the modulation transfer function (MTF). MTF is widely used in many imaging applications as a quantitative way of determining or measuring the resolution or sharpness of imaging devices. In digital radiography, MTF is dominantly decided by the scintillator screens used for X-ray absorption. Therefore, poor optical coupling due to the presence of air gaps or airborne contaminants at the interface of the scintillator screen and the photodetector can lead to increased TIR, reduced MTF, and result in poor image quality.

Conversely, improved optical coupling between the scintillator screen and the photodetector would help to boost efficiency and improve overall image quality accordingly. However, previously proposed solutions have shown only limited success, or may achieve improved optical coupling at the cost of increased complexity and higher expense, or may inadvertently introduce other problems. For example, while conventional pressure sensitive adhesives (PSAs), such as acrylic-based adhesives and laminates, have been used in the past to couple scintillator screens and photodetectors, PSAs are aggressively tacky at room temperature and strongly attract airborne contaminants such as dust. As such, when PSAs are used, extreme care must be taken to avoid trapping dust particles in the adhesive. For example, the scintillator screen should be stored and adhered to surfaces in a clean environment to minimize the introduction of contaminants.

Thus, while prior techniques may have achieved certain degrees of success in their particular applications, there is still room for improvement. Solutions that reduce or eliminate air gaps and/or airborne contaminants at the scintillator screen/photodetector interface without an elaborate number of steps and using materials appropriate for the scintillator or detector components would be particularly helpful.

SUMMARY OF THE INVENTION

In another aspect, there is also disclosed a method of making a scintillator screen comprising solvent coating an adhesive solution on a scintillation screen comprising a scintillator material to form a coated surface, the adhesive solution comprising a solvent and a solvent-coatable thermally-sensitive elastomer; and drying the coated surface of the scintillation screen to create an adhesive layer.

In an aspect, there is provided a phosphor screen comprising a substrate; a phosphor layer disposed over the substrate, the phosphor layer comprising a phosphor material; and an adhesive layer disposed by solvent coating over the phosphor layer, the adhesive layer comprising solvent-coatable thermally-sensitive elastomer, wherein the adhesive layer has a dust adhesion of ≤1 dust particles/sq.in.

In another aspect, there is also disclosed a method of making a phosphor screen comprising solvent coating an adhesive solution on a phosphor screen comprising a phosphor material to form a coated surface, the adhesive solution comprising a solvent and a solvent-coatable thermally-sensitive elastomer; and drying the coated surface of the phosphor screen to create an adhesive layer.

In a further aspect, there is disclosed a method of making an X-ray imaging panel comprising solvent coating an adhesive solution on an X-ray imaging element to form a coated surface, wherein the X-ray imaging element comprises a phosphor screen laminated with a preextruded polymer film, and wherein the adhesive solution comprises solvent-coatable thermally-sensitive elastomers; drying the coated surface of the X-ray imaging element to create an adhesive layer; contacting the adhesive layer on the X-ray imaging element with at least one preextruded polymer film and laminating the X-ray imaging element to the at least one preextruded polymer film.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

FIGS. 5A and 5B depict cross-sectional views of an X-ray imaging panel in accordance with various embodiments of the present disclosure.

DETAILED DESCRIPTION OF THE INVENTION

Figure 1:
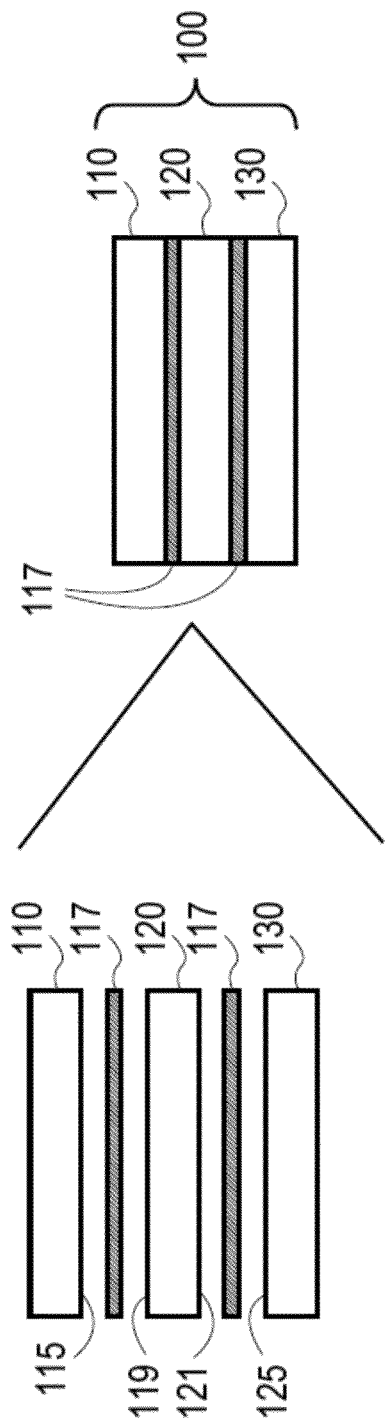
FIGS. 1A and 1B depict cross-sectional views of an X-ray imaging panel in accordance with various embodiments of the present disclosure.

The following is a detailed description of example embodiments of the invention, reference being made to the drawings in which the same reference numerals identify the same elements of structure in each of the several figures.

As described earlier, conventional optical adhesives have been proposed and utilized for maintaining contact between the scintillator screen and the photodetector array in a number of X-ray imaging panel designs; however, such conventional optical adhesives have presented difficulties, e.g., trapping airborne contaminants. For example, when PSAs are used, extreme care must be taken to avoid trapping dust particles in the tacky adhesive surface at room temperature. Scintillator screens manufactured with PSAs should be stored and adhered to surfaces in a clean environment to minimize the introduction of contaminants. If contaminants are trapped in the scintillator screen prior to being adhered to a photodetector, TIR may occur at the interface of the scintillator screen and photodetector, resulting in crosstalk, reduced MTF, and poor image quality.

The present disclosure provides an X-ray imaging panel wherein the scintillator screen and photodetector components are optically coupled or bonded together using an optical adhesive comprising a thermally-sensitive elastomer, which allows the adhesive surface of the scintillator screen to be non-tacky at room temperature. Thus, compared to scintillator screens manufactured with conventional optical adhesives, the disclosed scintillator screen does not trap dust and other contaminants, and can be stored and adhered to surfaces without requiring a clean environment.

As shown in FIGS. 1A and 1B, the scintillator screen can be coupled to a fiber optic plate (FOP) to form a laminated X-ray imaging element. The X-ray imaging element can be further coupled to at least one photodetector. As shown in FIGS. 1A and 1B, the FOP 120 can have a first surface 119 and a second surface 121 opposite the first surface. The FOP 120 can be positioned between the scintillator screen 110 and the at least one photodetector 130. Typically, the light from a radiation image is transmitted from the scintillator screen to the photodetector through each fiber in the FOP. Thus, even though the scintillator screen is coupled to the FOP, the scintillation properties of its light-emitting surface are maintained. In an aspect, the light-emitting surface 115 of the scintillation screen 110 can be coupled to a first surface 119 of the FOP 120 (thereby maintaining its scintillation properties) and the light-receiving surface 125 of the photodetector 130 can be coupled to a second surface 121 opposite the first surface 119 of the FOP 120 in a sandwich-like fashion, as shown in FIG. 1B, to form an X-ray imaging panel 100. The scintillator screen 110, the FOP 120, and the photodetector 130 can each be independently coupled or bonded using an adhesive layer 117 comprising the disclosed optical adhesive including a thermally-sensitive elastomer.

The scintillator screen can include a substrate and a scintillation layer disposed thereover to form a light-emitting surface. Scintillator screens disclosed herein can take any convenient form provided they meet all of the usual requirements for use in digital radiography. In aspects, any flexible or rigid material suitable for use in scintillator screens can be used as a substrate to coat the scintillation dispersion, such as glass, plastic films, ceramics, polymeric materials, carbon substrates, and the like. In embodiments, the substrate can be made of ceramic (e.g., $Al_2O_3$,) or metallic (e.g., Al) or polymeric (e.g., PET) materials.

The scintillation layer can include a scintillator material. As used herein, "scintillator material" and "scintillation material" are used interchangeably and are understood to mean a material emitting photons upon exposure to electromagnetic radiation, as ordinarily understood by those skilled in the art, unless otherwise specified. For example, "scintillator material" can refer to inorganic materials capable of immediately emitting low-energy photons (e.g., optical photons) upon stimulation with and absorption of high-energy photons (e.g., X-rays).

Such materials that can be used in embodiments of the present disclosure include metal oxides, metal oxyhalides, metal oxysulfides, metal halides, and the like, and combinations thereof.

In embodiments, the scintillator material can be a metal oxide, for example, $Y_2SiO_5$:Ce; $Y_2Si_2O_7$:Ce; $LuAlO_3$:Ce; $Lu_2SiO_5$:Ce; $Gd_2SiO_5$:Ce; $YAlO_3$:Ce; ZnO:Ga; $CdWO_4$; $LuPO_4$:Ce; $PbWO_4$; $Bi_4Ge_3O_{12}$; $CaWO_4$; $RE_3AlSiO_{12}$:Ce, and combinations thereof, wherein RE is at least one rare earth metal.

In another embodiment, the scintillator material can include one or more metal oxysulfides in addition to, or in place of, the metal oxides, such as $Gd_2O_2S$, $Gd_2O_2S$:Tb, $Gd_2O_2S$:Pr, and the like, and combinations thereof.

In other embodiments, the scintillator material can include a metal oxyhalide, such as LaOX:Tb, wherein X is Cl, Br, or I.

In further embodiments, the scintillator material can be a metal halide having a general formula of $M(X)_n$:Y, wherein M is at least one of La, Na, K, Rb, Cs; each X is independently F, Cl, Br, or I; Y is at least one of Tl, Tb, Na, Ce, Pr, and Eu;

and n is an integer between 1 and 4, inclusive. Such metal halides can include, for example, $LaCl_3$:Ce and $LaBr_3$:Ce, among others. Other metal halide species that can be used in embodiments of the present disclosure include $RbGd_2F_7$:Ce, $CeF_3$, $BaF_2$, CsI(Na), $CaF_2$:Eu, LiI:Eu, CsI, CsF, CsI:Tl, NaI:Tl, and combinations thereof. Halide-like species, such as CdS:In, and ZnS can also be used in embodiments of the present disclosure.

In exemplary embodiments, the scintillator material is a metal oxysulfide, such as $Gd_2O_2S$.

The scintillator material can be present in the scintillation layer in an amount ranging from about 50% by volume to about 99% by volume, for example from about 70% by volume to about 90% by volume, relative to the total volume of the scintillation layer.

In aspects, the scintillation layer can include a scintillation material dispersed in a polymeric binder. The scintillator material can be dispersed in any polymeric binder known in the art for such purposes. Generally, the weight ratio of scintillation material to binder determines the light emission of the screen and the image-sharpness. The weight ratio of scintillation material to polymeric binder can range from about 1:1 to 100:1, for example from about 80:20 to 95:5.

In embodiments, the polymeric binder can include, but is not limited to, vinyl resins, polyesters, polyurethanes, and combinations thereof. For example, non-limiting useful binders include polyvinyl butyral, polyvinyl acetate, nitrocellulose, ethylcellulose, vinylidene chloride-vinyl chloride copolymer, polyalkyl(meth)acrylate, vinyl chloride-vinyl acetate copolymer, polyurethane, cellulose acetate, cellulose acetate butyrate, polyvinyl alcohol, polystyrene, polyester, polycarbonate, polyestercarbonates, and combinations thereof.

The thickness of the scintillation layer can range from about 10 μm to about 1000 μm, for example from about 50 μm to about 750 μm, such as from about 100 μm to about 500 μm.

Optionally, the scintillator screen can include a protective overcoat disposed over the scintillation layer and under the disclosed adhesive layer. The protective overcoat can comprise one or more polymer binders normally used for this purpose, such as cellulose ester (e.g., cellulose acetate) and other polymers that provide the desired mechanical strength and scratch and moisture resistance.

In aspects, the scintillation material can be mixed with a dissolved binder in a solvent to prepare a dispersion ("scintillation dispersion"). The dispersion can be uniformly applied to a substrate by any known coating technique, e.g. doctor blade coating, roll coating, gravure coating or wire bar coating, and dried to form a scintillation layer. In other aspects, the binder can be cured, for example by UV radiation, electron beam (EB), or can proceed chemically as known in the art.

Non-limiting examples of solvent-coatable thermally-sensitive elastomers that can be used in embodiments of the present disclosure include thermoset polymers, thermoplastic polymers, and combinations thereof.

Exemplary thermoset polymers include, but are not limited to, polyester, epoxies, urea/formaldehyde (e.g., Bakelite®), melamine, polyimides, cyanate esters, vulcanized rubber, and the like.

Exemplary thermoplastic polymers include, but are not limited to, acrylic (e.g., PMMA), polyethylene, polypropylene, cellulose acetate, polystyrene, polyurethane, and the like.

In an embodiment, the thermally-sensitive elastomer is a thermoplastic polyurethane. The thermally-sensitive elastomer can be mixed in a solvent to prepare a solution ("adhesive solution"). Any solvent can be used provided the thermally-sensitive elastomers are soluble therein. A non-limiting example is acetone but any suitable solvent can be used. The solution can be applied to a substrate by any known coating technique, e.g. doctor blade coating, roll coating, gravure coating or wire bar coating, and dried to form an adhesive layer. The thermally-sensitive elastomers can be present in the solution in an amount ranging from about 0.01% to about 50% by weight, for example from about 0.1% to about 10% by weight, such as from about 1% to about 5% by weight. The solvent-coatable thermally sensitive elastomers can be present in the adhesive layer in an amount ranging from about 10% to about 100%.

Photodetectors useful herein can have a light-receiving surface and can be configured to detect photons generated from the light-emitting surface of the scintillator screen. Non-limiting examples of at least one photodetector include photodiodes, photomultiplier tubes (PMT), CCD sensors (e.g., EMCCD), image intensifiers, and the like, and combinations thereof. Choice of a particular photodetector will depend, in part, on the type of scintillator screen being fabricated and the intended use of the ultimate device fabricated with the disclosed scintillator screen.

In aspects, the optical adhesive has an adhesive strength greater than about 8 lbf/in, for example greater than about 12 lbf/in. In other aspects, the FOP can have a thickness ranging from about 0.5 mm to about 5 mm, for example from about 1 mm to about 4 mm, such as from about 2 mm to about 3 mm.

Figure 2:
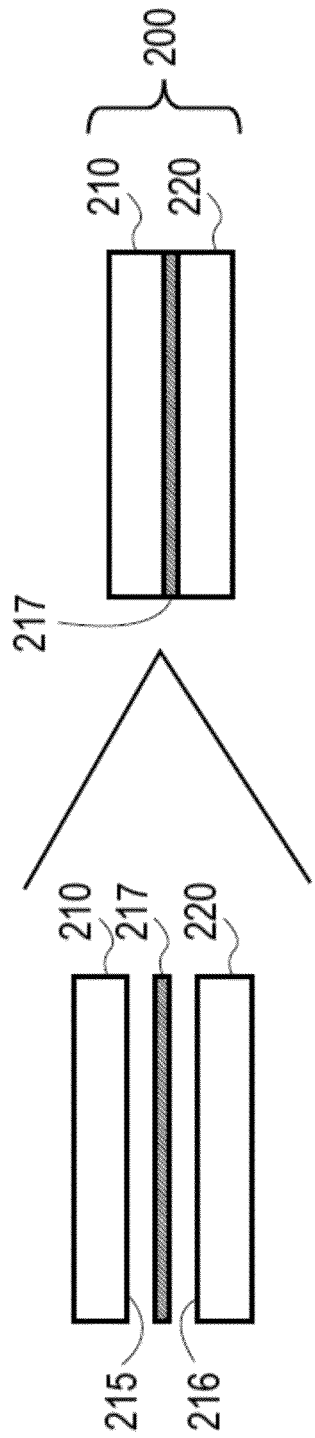
FIGS. 2A and 2B depict cross-sectional views of an X-ray imaging panel in accordance with various embodiments of the present disclosure.

As shown in FIGS. 2A and 2B, the scintillator screen 210 can be coupled directly to at least one photodetector 220 using the disclosed optical adhesive comprising a thermally-sensitive elastomer, without a FOP. The light-emitting surface 215 of the scintillation screen 210 can be directly coupled or bonded to the light-receiving surface 216 of the at least one photodetector 220 via an adhesive layer 217 comprising the disclosed optical adhesive to form an X-ray imaging panel 200.

In aspects, there is disclosed herein a method of making a scintillation screen, including applying an adhesive solution on a scintillation screen comprising a scintillator material to form a coated surface, the adhesive solution comprising a solvent and a thermally-sensitive elastomer; and drying the coated surface of the scintillation screen to create an adhesive layer. The method can further include contacting the adhesive layer on the scintillation screen with a fiber optic glass plate; and laminating the fiber optic glass plate and the scintillation screen to produce a laminated X-ray imaging element.

Any lamination technique known in the art suitable for preparing scintillation screens and X-ray imaging panels can be used herein without limitation. The scintillation screen can include a light-emitting surface. The light-emitting surface of the scintillation screen can be coupled to a first surface of the fiber optic glass plate. The fiber optic glass plate can further have a second surface opposite the first surface. The second surface can also be coated with the adhesive solution, and dried to form an adhesive layer on the fiber optic glass plate.

In aspects, there is disclosed herein a method of making an X-ray imaging panel, including applying an adhesive solution on an X-ray imaging element to form a coated surface, wherein the X-ray imaging element comprises a scintillation screen coupled to a fiber optic glass plate, and wherein the adhesive solution comprises thermally-sensitive elastomers; drying the coated surface of the X-ray imaging element to create an adhesive layer; contacting the adhesive layer on the X-ray imaging element with at least one photodetector; and laminating the X-ray imaging element to the at least one photodetector.

Any lamination technique known in the art suitable for preparing scintillation screens and X-ray imaging panels can be used herein without limitation. The fiber optic glass plate of the X-ray imaging element can be laminated to the light-receiving surface of the at least one photodetector.

Without being limited by theory, it is believed that because the disclosed optical adhesive is not tacky at room temperature, the adhesive has a low propensity to attract and trap airborne contaminates such as dust. In comparison, as discussed above, conventional adhesives like PSAs are aggressively tacky at room temperature and strongly attract and trap airborne contaminants. As such, a scintillator screen 110, 210 coated with the disclosed optical adhesive 117, 217 can be stored for a period of time and later coupled or bonded to a surface via lamination techniques without reduction in MTF or image quality. In other words, a scintillator screen coated with the disclosed adhesive 117, 217 can be stored for a period time without needing to be immediately bonded to a surface, and the resultant fabricated device with the scintillator screen still displays desirable image quality.

Without being limited by theory, it is believed that when heat and pressure from lamination techniques are applied to the disclosed optical adhesive 117, 217, the heat and pressure "activate" the thermally-sensitive elastomer to form a tacky adhesive surface for bonding. However, at room temperature, the adhesive surface 117, 217 is minimally tacky and has a low propensity for attracting airborne contaminants. Accordingly, because the disclosed optical adhesive repels far more airborne contaminates than conventional PSA adhesives at room temperature, X-ray imaging panels fabricated with the disclosed adhesive comprising thermally-sensitive elastomers will show reduced TIR (increased MTF) and therefore display improved image quality as compared to X-ray imaging panels manufactured with conventional PSA adhesives.

EXAMPLES

Comparative Example 1

A scintillator dispersion was prepared by first diluting 66.9 g of a 15% solution of Permuthane U-6366 binder from Stahl International in a mixture of a Methylene Chloride and Methanol (weight ratio of Methylene Chloride to Methanol in this dispersion was 12.7:1) with 34.7 g of the same solvent mixture of a Methylene Chloride and Methanol (The weight ratio of Methylene Chloride to Methanol in this dispersion was 12.7:1). Next, 300.0 g of terbium doped gadolinium oxysulfide, type 3010-55 from Nichia Corporation was added to the solution while mixing with a high speed mixer.

The scintillator dispersion prepared above was applied using a slot coating process to 7-mil thick polyethylene terephthalate (PET) films so as to achieve a dry scintillator coverage of approximately 40 g/ft$^2$ on each film. The PET support was pre-treated to improve adhesion of the scintillator coating. To improve coating uniformity, each PET film was cooled to a temperature of 15° C. during application of the scintillator dispersion. Once coated, each film was allowed to dry for 20 minutes while maintaining a film temperature of 15° C. The scintillator-coated films were then placed in a 70° C. oven for 5 minutes to remove residual solvent, forming scintillator screens.

Comparative Example 2

An acrylic adhesive coating solution was prepared by mixing 75 g of a polyacrylate PSA solution (Gelva GMS 788 from Cytec Industries) with 425 g of Ethyl Acetate. The acrylic adhesive solution was applied using a slot coating process over the scintillator screens from Comparative Example 1. The sample was laminated using a Differential Pressure Laminator onto a fiber optic glass plate (FOP) according to the conditions described below in Table 1.

TABLE 1

| Example | Lamination Temperature (° F.) | Vacuum Dwell (min) | Pressure Dwell (min) | Diaphragm Pressure (psi) |
|---|---|---|---|---|
| Comparative Example 2 | 310 | 1 | 8 | 15 |

Inventive Example 1

A thermoplastic polyurethane (TPU) adhesive coating solution was prepared by dissolving 57.5 g of a predominantly linear hydroxyl polyurethane (Desmocoll 530/3 from Bayer Material Science) in 442.7 g of acetone. After preparation, the thermoplastic adhesive coating solution was filtered through a 6 micron filter to remove any insoluble contaminates, and applied using a slot coating process over the scintillator screens from Comparative Example 1. The sample was laminated using a Differential Pressure Laminator onto a fiber optic glass plate (FOP) according to the conditions described below in Table 2.

TABLE 2

| Example | Lamination Temperature (° F.) | Vacuum Dwell (min) | Pressure Dwell (min) | Diaphragm Pressure (psi) |
|---|---|---|---|---|
| Inventive Example 1 | 310 | 1 | 8 | 15 |

Adhesive Strength Measurement

Figure 3:
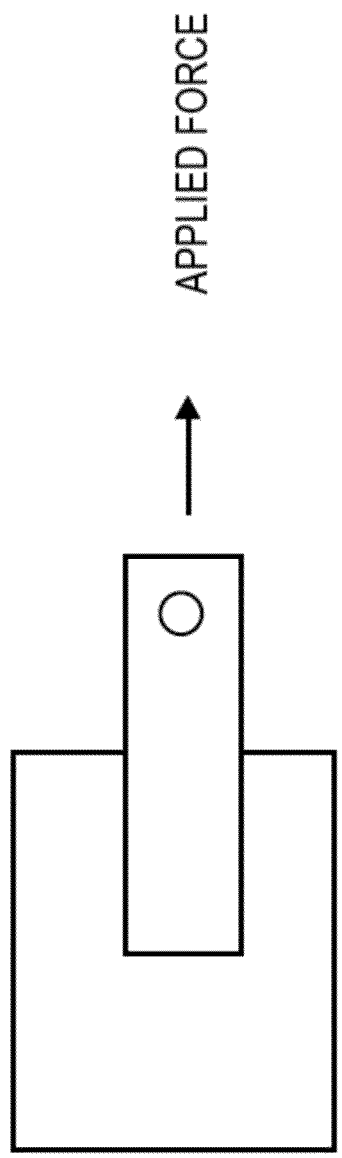
FIG. 3 depicts a method of testing adhesive bond strength.

The bond strength of the adhesives used to attach the scintillator screens was assessed by measuring the maximum sheer load required to de-laminate bonded screens. For each of the Comparative and Inventive Examples, a 0.5" by 2" scintillator screen was laminated to a FOP such that one half of the scintillator screen (0.5" by 1") was bonded to the FOP. The other half of the scintillator screen remained unbonded and extended beyond the edge of the FOP. A hole was punched in the unbonded end of each scintillator specimen so that a force gauge could be attached to the specimen, as shown in FIG. 3.

Laminated specimens where conditioned at 65° C. for 4 hours prior to testing. During testing, the laminated FOPs were held in a fixed position at 65° C. while a force gauge was used to apply a sheer load to the scintillator screen. Sheer force was applied to each scintillator screen at a rate of approximately 3-lbs per second.

Dust Assessment

To assess the adhesive coatings' propensity to trap airborne contaminates such as dust, 1 sq. in. samples of Comparative Example 2 and Inventive Example 1 were placed on a lab bench with the adhesive layers facing upward. The samples were left uncovered for 1 hour. The samples were then transferred to a Clean Hood. Compressed air was used to blow any free contaminate off the surface of the adhesive coatings. Samples were then examined under 7× magnification for the presence of trapped particle contaminate.

The results from the various tests are summarized in Table 3 below. MTF was measured using an Elitys Dental Generator using the following exposure conditions: 70 kV, 7 mA, 0.09 seconds.

TABLE 3

| Example | Dust Adhesion (# dust particles/ sq. in) | Line Pairs/mm @ MTF of 0.2 | Maximum Adhesive Sheer Strength (lbf/in) |
|---|---|---|---|
| Comparative Example 1 | 0 | 3.89 | 0 |
| Comparative Example 2 | 19 | 6.24 | 7.1 |
| Inventive Example 1 | 1 | 6.93 | >12 |

As seen in Table 3, Inventive Example 1 (thermally-sensitive adhesive) repelled dust nearly 20 times better than Comparative Example 2 (PSA adhesive). Furthermore, Inventive Example 1 bonded more strongly than Comparative Example 2. Inventive Example 1 also displayed the highest MTF value out of all tested specimens.

Near the beginning of the $20^{th}$ century, it was recognized that a medically useful anatomical image could be obtained when a film containing a radiation-sensitive silver halide emulsion is exposed to X-radiation (X-rays) passing through the patient. Subsequently, it was recognized that X-ray exposure could be decreased considerably by placing a radiographic phosphor panel adjacent to the film.

A radiographic phosphor panel typically contains a layer of an inorganic phosphor that can absorb X-rays and emit light to expose the film. The inorganic phosphor layer is generally a crystalline material that responds to X-rays in an image-wise fashion. Radiographic phosphor panels can be classified, based on the type of phosphors used, as prompt emission panels and image storage panels.

Image storage panels (also commonly referred to as "storage phosphor panels") typically contain a storage ("stimulable") phosphor capable of absorbing X-rays and storing its energy until subsequently stimulated to emit light in an image-wise fashion as a function of the stored X-ray pattern. A well-known use for storage phosphor panels is in computed or digital radiography. In these applications, the panel is first image-wise exposed to X-rays, which are absorbed by the inorganic phosphor particles, to create a latent image. While the phosphor particles may fluoresce to some degree, most of the absorbed X-rays are stored therein. At some interval after initial X-ray exposure, the storage phosphor panel is subjected to longer wave length radiation, such as visible or infrared light (e.g., stimulating light), resulting in the emission of the energy stored in the phosphor particles as stimulated luminescence (e.g, stimulated light) that is detected and converted into sequential electrical signals which are processed in order to render a visible image on recording materials, such as light-sensitive films or digital display devices (e.g., television or computer monitors). For example, a storage phosphor panel can be image-wise exposed to X-rays and subsequently stimulated by a laser having a red light or infrared beam, resulting in green or blue light emission that is detected and converted to electrical signals which are processed to render a visible image on a computer monitor. Thereafter, images from storage phosphor panels can be "erased" by exposure to UV radiation, such as from fluorescent lamps.

Thus, storage phosphor panels are typically expected to store as much incident X-rays as possible while emitting stored energy in a negligible amount until after subsequent stimulation; only after being subjected to stimulating light should the stored energy be released. In this way, storage phosphor panels can be repeatedly used to store and transmit radiation images.

By the same token, because storage phosphor panels can be repeatedly used, it is important to protect the phosphor layer from mechanical and environmental damage. Degradation of final images in storage phosphor panels from environmental factors (e.g., humidity, oxygen exposure, liquid exposure, etc.) or for mechanical reasons (e.g., abrasion, jamming, wear and tear, etc.) have been concerns for many years. This is particularly important, for example, in radiographic phosphor panels that are transported in scanning modules and/or handled without protective encasings. A solution to minimizing or eliminating the mechanical and environmental damage is to laminate a extruded polymer film to the surface of the phosphor coating, such as a thin polyethylene terephthalate (polyester or PET). PET films are extremely good resistance to environmental and mechanical damage, but require an adhesive, to enable adherence to surfaces.

Adhesives that are generally used for this purpose are pressure sensitive adhesives (PSAs), such as acrylic-based PSAs, which are aggressively tacky at room temperature and strongly attract airborne contaminants such as dust. As such, when PSAs are used, extreme care must be taken to avoid trapping dust particles in the adhesive. For example, the phosphor screen should be stored and adhered to surfaces in a clean environment to minimize the introduction of contaminants.

Thus, while prior techniques may have achieved certain degrees of success in their particular applications, there is still room for improvement. Solutions that enable lamination of preeextruded polymer films onto phosphor screen surfaces to provide environment and/or mechanical protection/without an elaborate number of steps and using materials appropriate for the phosphor would be particularly helpful.

Exemplary embodiments herein provide storage phosphor panels and methods of preparing thereof.

Figure 4:
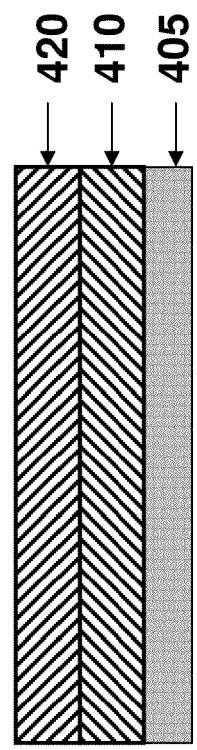
FIG. 4 depicts an exemplary portion of a storage phosphor panel in accordance with various embodiments of the present disclosure.

FIG. 4 depicts a portion of an exemplary storage phosphor panel 400 in accordance with various embodiments of the present disclosure. As used herein, "storage phosphor panel" is understood to have its ordinary meaning in the art unless otherwise specified, and refers to phosphor panels or screens that can "store" X-radiation (X-rays) for emission at a later time when the screen is irradiated ("stimulated") with other radiation (usually with visible or infrared "stimulating light"). It should be readily apparent to one of ordinary skill in the art that the storage phosphor panel 400 depicted in FIG. 4 represents a generalized schematic illustration and that other components can be added or existing components can be removed or modified.

Storage phosphor panels disclosed herein can take any convenient form provided they meet all of the usual requirements for use in computed or digital radiography. Examples of construction, composition, methods of preparation, and use thereof, are described, for example, in U.S. Pat. Nos. 4,380,702; 4,926,047; 5,077,144; 5,401,971; 5,427,868; 5,464,568; 5,507,976; 5,523,558; 5,639,400; and Canadian Patent No. 1,246,300, the disclosures of which are incorporated herein by reference in their entirety.

As shown in FIG. 4, the storage phosphor panel 400 can include a substrate 410, a phosphor layer 420 disposed over the substrate, Any flexible or rigid material suitable for use in storage phosphor panels can be used as the substrate 410, such as glass, plastic films, ceramics, polymeric materials, polymeric materials disposed on or laminated to a rigid metal sheet such as copper or aluminum, and combinations thereof. In certain embodiments, the substrate 410 can be made of flexible plastic or thermoplastic materials. The substrate 410 can include, for example, cellulose nitrates, cellulose esters, cellulose acetates (e.g., cellulose triacetates, cellulose diacetates, and the like), homo- and copolymers of olefins (e.g., polyethylenes and polypropylenes, and the like), homo- and copolymers of vinyl chloride (e.g., polyvinyl chloride and the like), homo- and copolymers of vinyl acetate (e.g., polyvinyl acetate and the like), polyesters of dibasic aromatic carboxylic acids with divalent alcohols (e.g., polyethylene terephthalalates, polyethylene napththalates, and the like), polyamides, polyimides, polycarbonates, polyesters, polystyrenes, and the like, and combinations thereof. Preferred thermoplastics include cellulose acetates, polyesters, polyethyelene terephthalalates, polyetheylene naphthalates, polyamides, polyimides, triacetates, polycarbonates, silicates, and combinations thereof.

In an aspect, black absorbing materials can be incorporated into or coated onto the substrate 410 as an anti-halation layer 405 to enhance radiation absorption. For example, in an embodiment, black absorbing materials comprising black dyes or carbon black and a suitable binder can be incorporated directly into the substrate 410 materials. Alternatively, black absorbing materials comprising black dyes or carbon black and a suitable binder can be applied on the backside of the substrate 410 as an anti-halation layer 405—e.g., on the opposite side of the substrate 410 comprising the phosphor layer 420 and further away from the X-ray source than the phosphor layer 420. Air can be trapped in the substrate 410 to reflect UV and visible radiation. If desired, adhesion-promoting subbing layers can be employed to help the phosphor layer 420 properly adhere to the substrate 410. In aspects, the adhesion-promoting subbing layers are not tinted and do not comprise a colorant. In an embodiment, the adhesion-promoting subbing layers are devoid of a colorant except for trace amounts due to contamination. If desired, a suitable anti-curl layer can be disposed on the backside of the substrate 410—e.g., above or below the anti-halation layer on the side of the substrate 410 opposite the phosphor layer 420. The anti-curl layer can optionally comprise black absorbing materials comprising black dyes, carbon black, and combinations thereof, dispersed within a polycarbonate binder; a lubricant, such as a micronized wax; and/or matte particles, such as organic polymer beads or inorganic particles.

In an embodiment, a light-reflecting layer or light-absorbing layer is not incorporated or disposed between the substrate 410 and the phosphor layer 420. For example, a light-reflecting layer comprising white pigment particles, such as titanium dioxide or barium sulfate, or a light-absorbing layer comprising a colorant such as colored dyes and pigments, including carbon black, to absorb stimulating light, is not incorporated or disposed between the substrate 410 and the phosphor layer 420.

The thickness of the substrate 410 can vary depending on the materials used so long as it is capable of supporting itself and layers disposed thereupon. Generally, the support can have a thickness ranging from about 50 µm to about 1,000 µm, for example from about 80 µm to about 1000 µm, such as from about 80 µm to about 500 µm. The substrate 410 can have a smooth and/or matte surface to promote adhesion with the phosphor layer 420.

The phosphor layer 420 can be disposed over the substrate 410. The phosphor layer 420 can include stimulable phosphor particles and a binder. As used herein, "storage phosphor particles" and "stimulable phosphor particles" are used interchangeably and are understood to have the ordinary meaning as understood by those skilled in the art unless otherwise specified. "Storage phosphor particles" or "stimulable phosphor particles" refer to phosphor crystals capable of absorbing and storing X-rays and emitting electromagnetic radiation (e.g., light) of a second wavelength when exposed to or stimulated by radiation of still another wavelength. Generally, stimulable phosphor particles are opaque polycrystals having particle diameters of several micrometers to several hundreds of micrometers; however, fine phosphor particles of submicron to nano sizes have also been synthesized and can be useful. It is generally appreciated that sharper images can be realized with smaller mean particle sizes; however, light emission efficacy declines with decreasing particle size. Thus, the optimum mean particle size for a given application is a reflection of the balance between imaging speed and desired image sharpness.

Stimulable phosphor particles can be obtained by doping, for example, rare earth ions as an activator into a parent material such as oxides, nitrides, oxynitrides, sulfides, oxysulfides, silicates, halides, and the like, and combinations thereof. As used herein, "rare earth" refers to chemical elements having an atomic number of 39 or 57 through 71 (also known as "lanthanoids"). Stimulable phosphor particles are capable of absorbing a wide range of electromagnetic radiation. In preferred embodiments, stimulable phosphor particles can absorb radiation having a wavelength of from about 0.01 to about 10 nm (e.g., X-rays) and from about 300 nm to about 400 µm (e.g., UV, visible, and infrared light). When stimulated with stimulating light having a wavelength in the range of visible and infrared light, stimulable phosphor particles can emit stimulated light at a wavelength of from about 300 nm to about 650 nm, preferably from about 350 nm to about 450 nm.

Suitable exemplary stimulable phosphor particles for use herein include, but are not limited to, compounds having Formula (I):

$$MFX_{1-z}I_zuM^aX^a:yA:eQ:tD \quad (I)$$

wherein M is selected from the group consisting of Mg, Ca, Sr, Ba, and combinations thereof;

X is selected from the group consisting Cl, Br, and combinations thereof;

$M^a$ is selected from the group consisting of Na, K, Rb, Cs, and combinations thereof;

$X^a$ is selected from the group consisting of F, Cl, Br, I, and combinations thereof;

A is selected from the group consisting of Eu, Ce, Sm, Tb, Bi, and combinations thereof;

Q is selected from the group consisting of BeO, MgO, CaO, SrO, BaO, ZnO, $Al_2O_3$, $La_2O_3$, $In_2O_3$, $SiO_2$, $TiO_2$, $ZrO_2$, $GeO_2$, $Nb_2O_5$, $Ta_2O_5$, $ThO_2$, and combinations thereof;

D is selected from the group consisting of V, Cr, Mn, Fe, Co, Ni, and combinations thereof;

z is from about 0.0001 to about 1;

u is from about 0 to about 1;

y is from about 0.0001 to about 0.1;

e is from 0 to about 1; and t is from 0 to about 0.01.

The amounts represented by "z", "u", "y", "e", and "t" are molar amounts. The same designations appearing elsewhere in this disclosure have the same meanings unless otherwise specified. In Formula (I), preferably, M is Ba; X is Br; $M^a$ is selected from the group consisting of Na, K, and combinations thereof; $X^a$ is selected from the group consisting of F, Br, and combinations thereof; A is Eu; Q is selected from the group consisting of $SiO_2$, $Al_2O_3$, and combinations thereof; and t is 0.

Other exemplary stimulable phosphor particles for use herein include, but are not limited to, compounds having Formula (II):

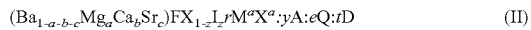

$$(Ba_{1-a-b-c}Mg_aCa_bSr_c)FX_{1-z}I_zrM^aX^a{:}yA{:}eQ{:}tD \qquad (II)$$

wherein X, $M^a$, $X^a$, A, Q, D e, t, z, and y are as defined above for Formula (I); the sum of a, b, and c, is from 0 to about 0.4; and r is from about $10^{-6}$ to about 0.1.

In Formula (II), preferably X is Br; $M^a$ is selected from the group consisting of Na, K, and combinations thereof; $X^a$ is selected from the group consisting of F, Br, and combinations thereof; A is selected from the group consisting of Eu, Ce, Bi, and combinations thereof; Q is selected from the group consisting of $SiO_2$, $Al_2O_3$, and combinations thereof; and t is 0.

Further exemplary stimulable phosphor particles for use herein include, but are not limited to, compounds having Formula (III):

$$M^{1+}{}_aM^{2+}X'{}_2bM^{3+}X''3{:}cZ \qquad (III)$$

wherein M is selected from the group consisting of Li, na, K, Cs, Rb, and combinations thereof;
$M^{2+}$ is selected from the group consisting of Be, Mg, Ca, Sr, Ba, Zn, Cd, Cu, Pb, Ni, and combinations thereof;
$M^{3+}$ is selected from the group consisting of Sc, Y, La, Ce, Pr, Nd, Pm, Sm, Eu, Gd, Tb, Dy Ho, Er, Tm Yb, Lum Al, Bi, In, Ga, and combinations thereof;
Z is selected from the group consisting of $Ga^{1+}$, $Ge^{2+}$, $Sn^{2+}$, $Sb^{3+}$, $As^{3+}$, and combinations thereof;
X, X' and X'' can be the same or different and each individually represents a halogen atom selected from the group consisting of F, Br, Cl, I; and $0 \le a \le 1$; $0 \le b \le 1$; $0 \le c \le 0.2$.

Preferred stimulable phosphor particles represented by Formulas (I), (II), or (III) include europium activated barium fluorobromides (e.g., BaFBr:Eu and BaFBrI:Eu), cerium activated alkaline earth metal halides, cerium activated oxyhalides, divalent europium activated alkaline earth metal fluorohalides, (e.g., Ba(Sr)FBr:$Eu^{2+}$) divalent europium activated alkaline earth metal halides, rare earth element activated rare earth oxyhalides, bismuth activated alkaline metal halide phosphors, and combinations thereof.

The phosphor layer 420 can further include one or more polymeric binders to provide structural adherence. Suitable binders can include a variety of organic polymers known for being transparent to X-rays, stimulating light, and stimulated light. Suitable exemplary binders include, but are not limited to, sodium o-sulfobenzaldehyde acetal of poly(vinyl alcohol), chlorosulfonated poly(ethylene), a mixture of macromolecular bisphenol poly(carbonates), cellulose acetate butyrate, styrene-butadiene copolymers, copolymers comprising bisphenol carbonates and poly(alkylene oxides), poly (alkyl acrylates), poly(alkyl methacrylates), alkyl acetates, copolymers of poly(alkyl acrylates) and poly(alkyl methacrylates) with acrylic and methacrylic acid, poly(vinyl butyrals), polyurethanes, gelatin, polysaccharides (e.g., dextran and gum arabic), poly(vinyl acetate), nitrocellulose, ethylcellulose, copolymers of vinylidene chloride and vinyl chloride, poly(vinyl alcohol), linear polyesters, and combinations thereof. Particularly useful binders include polyurethanes such as those commercially available under the trademarks ESTANE® (Goodrich Chemical) and PERMUTHANE® (Stahl International by). Alternatively, the phosphor layer 420 can include stimulable phosphor particles without a binder (binderless phosphor layer).

It is appreciated that thinner phosphor layers and sharper images can be realized when a high weight ratio of stimulable phosphor particles to binder is used. Generally, the weight ratio of stimulable phosphor particles to binder is at least 7:1, for example from about 7:1 to about 50:1, such as from about 10:1 to about 30:1. The dry thickness of the phosphor layer can range from about 10 μm to about 500 μm, preferably from about 25 μm to about 300 μm. The density of stimulable phosphor particles in the dry phosphor layer 420 can range from about 5 to about 5000 g/m2, preferably from about 150 to about 1500 g/m2, most preferably from about 300 to about 1000 g/m2. In aspects, the phosphor layer 420 does not comprise a colorant (e.g., dye, pigment, carbon black, and the like) to absorb stimulating light or to reflect stimulated light. In an embodiment, the phosphor layer 420 is devoid of or essentially free of a colorant except for trace amounts due to contamination.

As described earlier, conventional optical adhesives have been proposed and utilized for maintaining contact between the phosphor screen and the photodetector array in a number of X-ray imaging panel designs; however, such conventional optical adhesives have presented difficulties, e.g., trapping airborne contaminants. For example, when PSAs are used, extreme care must be taken to avoid trapping dust particles in the tacky adhesive surface at room temperature. Phosphor screens manufactured with PSAs should be stored and adhered to surfaces in a clean environment to reduce or minimize the introduction of contaminants. If contaminants are trapped in the phosphor screen the resultant image quality would be poor.

The present disclosure provides an X-ray imaging panel wherein the phosphor screen and laminated protective polymer film are optically coupled or bonded together using a solvent coatable optical adhesive comprising a thermally-sensitive elastomer, which allows the adhesive surface of the phosphor screen to be non-tacky at room temperature. Thus, compared to phosphor screens manufactured with conventional optical adhesives, the disclosed phosphor screen does not trap dust and other contaminants, and can be stored and adhered to surfaces without requiring a clean environment.

Non-limiting examples of solvent-coatable thermally-sensitive elastomers that can be used in embodiments of the present disclosure include thermoset polymers, thermoplastic polymers, and combinations thereof.

Exemplary thermoset polymers include, but are not limited to, polyester, epoxies, urea/formaldehyde (e.g., Bakelite®), melamine, polyimides, cyanate esters, vulcanized rubber, and the like.

Exemplary thermoplastic polymers include, but are not limited to, acrylic (e.g., PMMA), polyethylene, polypropylene, cellulose acetate, polystyrene, polyurethane, and the like.

In an embodiment, the thermally-sensitive elastomer is a thermoplastic polyurethane. The thermally-sensitive elastomer can be mixed in a solvent to prepare a solution ("adhesive solution"). Any solvent can be used provided the thermally-sensitive elastomers are soluble therein. A non-limiting example is acetone but any suitable solvent can be used. The solution can be applied to a substrate by any known coating technique, e.g. doctor blade coating, roll coating, gravure coating or wire bar coating, and dried to form an adhesive layer. The thermally-sensitive elastomers can be present in the solution in an amount ranging from about 0.01% to about 50% by weight, for example from about 0.1% to about 10% by weight, such as from about 1% to about 5% by weight. The solvent-coatable thermally sensitive elastomers can be present in the adhesive layer in an amount ranging from about 10% to about 100%.

As shown in FIGS. 5A and 5B, the phosphor screen 510 can be coupled directly to preextruded polymer film 520 using the disclosed optical adhesive comprising a thermally-sensitive elastomer. The light-emitting surface 515 of the phosphor screen 510 can be directly coupled or bonded to the first surface 516 of the preextruded polymer film 520 via an adhesive layer 517 comprising the disclosed optical adhesive to form an X-ray imaging panel 500.

In aspects, there is disclosed herein a method of making a phosphor screen, including applying an adhesive solution on a phosphor screen comprising a phosphor material to form a coated surface, the adhesive solution comprising a solvent and a thermally-sensitive elastomer; and drying the coated surface of the phosphor screen to create an adhesive layer. The method can further include contacting the adhesive layer on the phosphor screen with a preextruded polymer film and laminating the preextruded polymer film and the phosphor screen to produce a laminated X-ray imaging element.

Any lamination technique known in the art suitable for preparing phosphor screens and X-ray imaging panels can be used herein without limitation. The phosphor screen can include a light-emitting surface. The light-emitting surface of the phosphor screen can be coupled to a first surface of the perextruded polymer film. The preextruded polymer film can further have a second surface opposite the first surface.

Without being limited by theory, it is believed that because the disclosed optical adhesive is not tacky at room temperature, the adhesive has a low propensity to attract and trap airborne contaminates such as dust. In comparison, as discussed above, conventional adhesives like PSAs are aggressively tacky at room temperature and strongly attract and trap airborne contaminants. As such, a phosphor screen 510 coated with the disclosed optical adhesive 517 can be stored for a period of time and later coupled or bonded to a surface via lamination techniques without reduction in MTF or image quality. In other words, a phosphor screen coated with the disclosed adhesive 517 can be stored for a period time without needing to be immediately bonded to a surface, and the resultant fabricated device with the phosphor screen still displays desirable image quality.

Without being limited by theory, it is believed that when heat and pressure from lamination techniques are applied to the disclosed optical adhesive 517, the heat and pressure "activate" the thermally-sensitive elastomer to form a tacky adhesive surface for bonding. However, at room temperature, the adhesive surface 517 is minimally tacky and has a low propensity for attracting airborne contaminants. Accordingly, because the disclosed optical adhesive repels far more airborne contaminates than conventional PSA adhesives at room temperature, X-ray imaging panels fabricated with the disclosed adhesive comprising thermally-sensitive elastomers will show reduced noise therefore display improved image quality as compared to X-ray imaging panels manufactured with conventional PSA adhesives.

EXAMPLES

Comparative Example 3

A phosphor solution was prepared by dispersing 61.9% by weight of a stimulable phosphor, such as those described in U.S. Pat. No. 5,523,558 and U.S. Pat. No. 5,549,843 (the disclosures of which are herein incorporated by reference in their entirety); 4.22% by weight of a polyurethane binder (Permuthane® U-6366); 1.24% by weight of barium thiosulfate; 0.0005% by weight of ($SiO_2$); and 0.000867% of tetrabutyl ammonium thiosulfate into 32.6% by weight of a 93:7 (ratio by weight) methylene chloride to methanol solvent system. The ratio of phosphor to binder was about 15:1 by weight.

The phosphor solution was coated as a dispersion onto a flexible poly(ethylene phthalalate) substrate using a slot die coating method and subsequently dried to remove solvent. The density (total dry coverage) of the phosphor layer was about 400 g/m$^2$. The phosphor layer was about 150 μm thick. An anti-halation layer comprising carbon black and cellulose acetate binder was applied to the opposite side of the support at a density (total dry coverage) of about 50 g/m$^2$. After drying, the composite film of phosphor layer and polyester substrate was wound into rolls and immediately stored in a dry box with desiccant (less than 10% humidity) until it was used for testing.

An acrylic adhesive overcoat solution was prepared by mixing 100 g of a polyacrylate PSA solution (Gelva GMS 1151 from Cytec Industries) with 62.5 g of Toluene. The adhesive overcoat solution was applied onto the phosphor layer by knife blade coating and dried to a residual solvent level of less than 1% by weight of the final dry overcoat to form a storage phosphor panel. The overcoat formulation was applied to provide a density (total dry coverage) of about 18 g/m$^2$. The overcoat layer was about 10 μm thick.

To assess the adhesive coatings' propensity to trap airborne contaminates such as dust, a 27×27 cm of the coated sample was placed on a lab bench with the adhesive layers facing upward, uncovered for 24 hours. A small section of the coated sample, 2.5×2.5 cm was examined under a 7× magnification for the presence of trapped particle contaminate and was known to be representative of the entire area.

Inventive Example 2

A polyvinyl butyral adhesive coating solution was prepared by dissolving 12.5 grams of Butvar 76 in 88.5 grams of Ethyl Acetate The adhesive overcoat solution was applied onto the phosphor layer, prepared as describe in Comparative example 3, by knife blade coating and dried to a residual solvent level of less than 1% by weight of the final dry overcoat to form a storage phosphor panel. The overcoat formulation was applied to provide a density (total dry coverage) of about 18 g/m$^2$. The overcoat layer was about 10 μm thick.

To assess the adhesive coatings' propensity to trap airborne contaminates such as dust, a 27×27 cm of the coated sample was placed on a lab bench with the adhesive layers facing upward, uncovered for 24 hours. A small section of the coated sample, 2.5×2.5 cm was examined under a 7× magnification for the presence of trapped particle contaminate and was known to be representative of the entire area.

Inventive Example 3

A copolyester adhesive coating solution was prepared by dissolving 18.5 grams of Bostik Vitel 2700b in 81.5 grams of Ethyl Acetate . . . . The adhesive overcoat solution was applied onto the phosphor layer, prepared as describe in Comparative example 3, by knife blade coating and dried to a residual solvent level of less than 1% by weight of the final dry overcoat to form a storage phosphor panel. The overcoat formulation was applied to provide a density (total dry coverage) of about 18 g/m$^2$. The overcoat layer was about 10 μm thick.

To assess the adhesive coatings' propensity to trap airborne contaminates such as dust a 27×27 cm of the coated sample was placed on a lab bench with the adhesive layers facing upward, uncovered for 24 hours. A small section of the coated sample, 2.5×2.5 cm was examined under a 7× magnification for the presence of trapped particle contaminate and was known to be representative of the entire area.

TABLE 4

| Example | Dust Adhesion (# dust particles/sq. in) |
| --- | --- |
| Comparative Example 3 | >50 |
| Inventive Example 2 | <2 |
| Inventive Example 3 | <1 |

As seen in Table 4, Inventive Examples 2 & 3, (thermally-sensitive adhesive) repelled dust nearly 25 times better than Comparative Example 3 (PSA adhesive).

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. In addition, while a particular feature of the invention can have been disclosed with respect to only one of several implementations/embodiments, such feature can be combined with one or more other features of the other implementations/embodiments as can be desired and advantageous for any given or particular function. The term "at least one of" is used to mean one or more of the listed items can be selected. The term "about" indicates that the value listed can be somewhat altered, as long as the alteration does not result in nonconformance of the process or structure to the illustrated embodiment. Finally, "exemplary" indicates the description is used as an example, rather than implying that it is an ideal. The scope of the invention is indicated by the appended claims, and all changes that come within the meaning and range of equivalents thereof are intended to be embraced therein.

The invention claimed is:

1. A phosphor screen comprising:
    a substrate;
    a stimulable phosphor layer disposed over the substrate, the stimulable phosphor layer comprising a stimulable phosphor material; and
    an adhesive layer disposed by solvent coating over the stimulable phosphor layer, the adhesive layer comprising solvent-coatable thermally-sensitive elastomers, wherein the adhesive layer has a dust adhesion of ≤1 dust particles/sq.in.

2. The phosphor screen of claim 1, wherein the thermally-sensitive elastomer is selected from the group consisting of thermoset polymers, thermoplastic polymers, and combinations thereof.

3. The phosphor screen of claim 2, wherein the solvent-coatable thermoset polymers are selected from the group consisting of polyesters, epoxies, urea/formaldehyde, melamine, cyanate esters, polyurethane, and combinations thereof.

4. The phosphor screen of claim 2, wherein the thermoplastic polymers are selected from the group consisting of acrylic, polyethylene, polypropylene, cellulose acetate, polystyrene, polyurethane, and combinations thereof.

5. The phosphor screen of claim 1, wherein the solvent-coatable thermally-sensitive elastomer is a thermoplastic copolyester.

6. The phosphor screen of claim 1, wherein the solvent-coatable thermally-sensitive elastomer is present in the adhesive layer in an amount ranging from about 10% to about 100%.

7. The phosphor screen of claim 1, where the stimulable phosphor material comprises a thickness ranging from about 10 μm to about 500 μm.

8. The phosphor screen of claim 1, where the substrate is selected from the group consisting of glass, plastic films, ceramics, polymeric materials, polymeric materials disposed over a rigid metal sheet, and combinations thereof.

9. The phosphor screen of claim 1, further comprising a protective polymer film coupled to the phosphor screen by an adhesive layer comprising thermally-sensitive elastomers to form an X-ray imaging element.

10. A method of making a phosphor screen, comprising:
    solvent coating an adhesive solution on a storage phosphor screen comprising a storage phosphor material to form a coated surface, the adhesive solution comprising a solvent and a solvent-coatable thermally-sensitive elastomer; and
    drying the coated surface of the storage phosphor screen to create an adhesive layer.

11. The method of claim 10, further comprising:
    contacting the adhesive layer on the storage phosphor screen with a protective polymer film; and
    laminating the protective polymer film and the storage phosphor screen to produce a laminated X-ray imaging element.

12. The method of claim 10, wherein the thermally-sensitive elastomer is selected from the group consisting of thermoset polymers, thermoplastic polymers, and combinations thereof.

13. The method of claim 10, wherein the thermally-sensitive elastomer is a thermoplastic copolyester.

14. The method of claim 10, wherein the thermally-sensitive elastomer is present in the adhesive solution in an amount ranging from about 0.1% to about 50%.

15. A method of making an X-ray imaging panel comprising:
    solvent coating an adhesive solution on an X-ray imaging element to form a coated surface, wherein the X-ray imaging element comprises a storage phosphor screen coupled to a protective polymer film, and wherein the adhesive solution comprises thermally-sensitive elastomers;
    drying the coated surface of the X-ray imaging element to create an adhesive layer;
    contacting the adhesive layer on the X-ray imaging element with at least one protective polymer film; and
    laminating the X-ray imaging element to the at least one protective polymer film.

16. The method of claim 15, wherein the thermally-sensitive elastomer is selected from the group consisting of thermoset polymers, thermoplastic polymers, and combinations thereof, where the protective polymer film is a polyester film about 5-25 microns thick.

17. The method of claim 15, wherein the thermally-sensitive elastomer is a thermoplastic copolyester or a thermoplastic polybutyral.

18. The method of claim 15, wherein the thermally-sensitive elastomer is present in the adhesive solution in an amount ranging from about 0.1% to about 50%.

* * * * *